United States Patent

[11] 3,534,758

| [72] | Inventor | Gunnar Heskestad<br>Piscataway, New Jersey |
|---|---|---|
| [21] | Appl. No. | 769,334 |
| [22] | Filed | Oct. 21, 1968 |
| [45] | Patented | Oct. 20, 1970 |
| [73] | Assignee | American Standard Inc.<br>New York, New York<br>a corporation of Delaware |

[54] FLUID DEFLECTION MECHANISM
19 Claims, 13 Drawing Figs.

[52] U.S. Cl. ..................................... 137/81.5
[51] Int. Cl. ..................................... F15c 1/04, F15c 1/14
[50] Field of Search ........................... 137/81.5

[56] References Cited
UNITED STATES PATENTS

| 3,039,490 | 6/1962 | Carlson | 137/81.5 |
| 3,181,545 | 5/1965 | Murphy | 137/81.5 |
| 3,209,775 | 10/1965 | Dexter et al. | 137/81.5 |
| 3,233,622 | 2/1966 | Boothe | 137/81.5 |
| 3,276,463 | 10/1966 | Bowles | 137/81.5 |
| 3,276,473 | 10/1966 | Lewis et al. | 137/81.5X |
| 3,285,262 | 11/1966 | Ernst et al. | 137/81.5 |
| 3,429,323 | 2/1969 | Mott | 137/81.5 |
| 3,447,553 | 6/1969 | Campagnuolo et al. | 137/81.5 |
| 3,452,769 | 7/1969 | Jones et al. | 137/81.5 |

*Primary Examiner*—Samuel Scott
*Attorney*—Jefferson Ehrlich, Tennes I. Erstad and Robert G. Crooks ABSTRACT: Covers an arrangement for the radial or other deflection of a jet of fluid emitted by a pipe or nozzle. The arrangement includes a slot at the mouth or exit of the pipe or nozzle through which suction is applied at, for example, the mouth of the pipe or nozzle and a disk-shaped control body positioned in the path of fluid traversing the pipe or nozzle. Both the suction through the slot and the control body coact to change the path of the emitted fluid through any desired angle or to change the path of the emitted fluid into a substantially conical sheet of fluid having any desired divergence or conical angle.

Patented Oct. 20, 1970

3,534,758

INVENTOR.
GUNNAR HESKESTAD
BY Jefferson Ehrlich

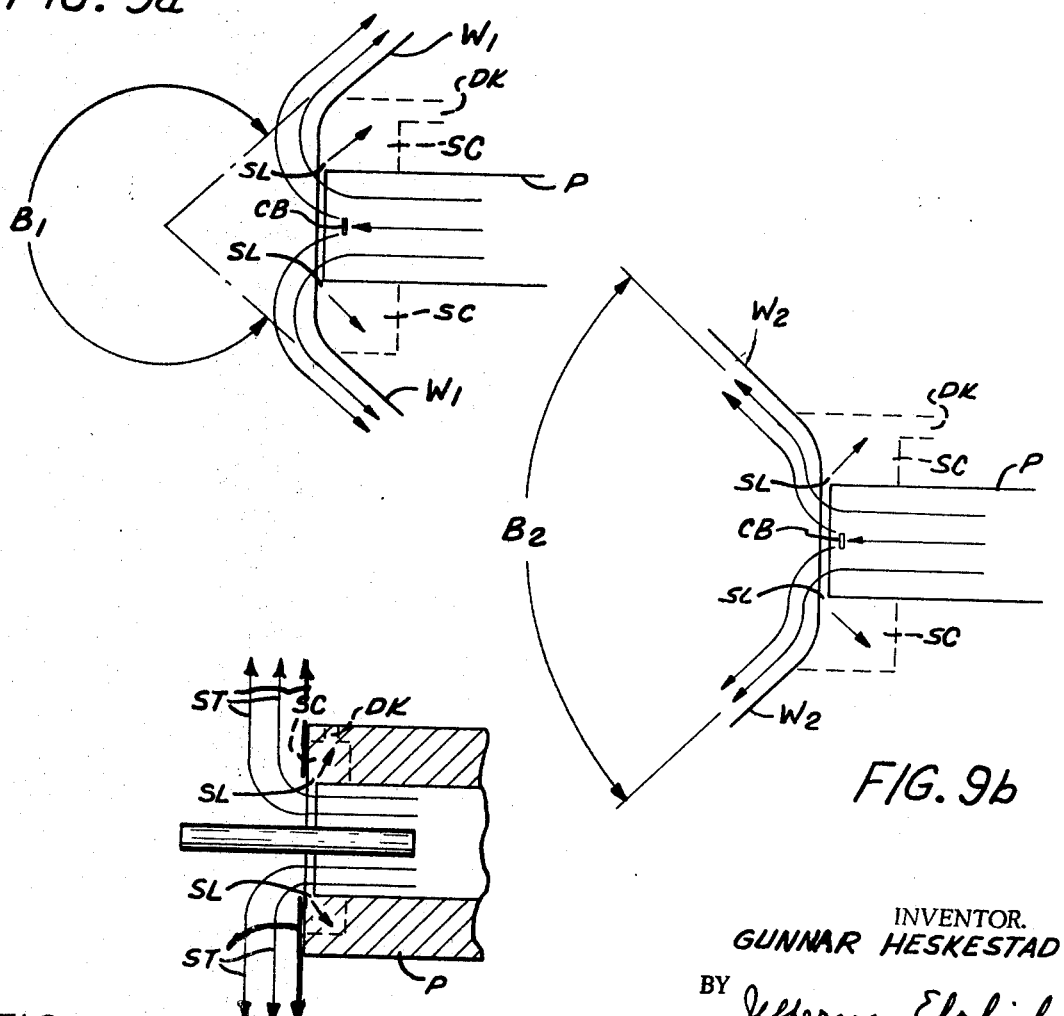

FLUID DEFLECTION MECHANISM

This invention relates to fluidic structures and, more particularly, to fluidic structures for deflecting a jet of fluid from its normal or axial path. Still more particularly, this invention relates to fluidic structures in which a jet of fluid traversing a normal or axial path is deflected through an angle of, for example, 90° from its normal or axial path or through any other angle (within certain limits).

Structures have heretofore been devised for deflecting the flow of fluid through a nozzle or pipe (the terms nozzle or pipe being used interchangeably in this specification). One such structure includes a nozzle having a slit which is supplied with suction acting to cause the fluid exiting from the nozzle to be deflected in the direction from which suction is applied. In this connection it is observed that the axial path of fluid emitted through a nozzle would travel substantially unchanged in direction unless the fluid were directly affected by a coacting or contravening force, such as suction, applied to the jet of fluid so as to cause the jet to be deflected. The amount of deflection will, of course, be affected by and will correspond to the amount and direction of the suction applied to the exiting fluid. In general, the greater the suction, the greater will be the deflection. It is also well known that the relative direction in which the path of the jet is deflected will depend upon the nature of the contravening fluid, that is, whether the fluid is subjected to pressure or to suction. In some cases, pressure, although opposite in effect to suction, may be employed to achieve the same angular deviation.

It is an additional fact that an obstruction, such as a disk, inserted into the path of a fluid exiting from a nozzle and relatively large with respect to the area of the nozzle, will likewise deflect the path of the fluid. However, the amount of deflection will depend upon a number of factors, including the proximity of the disk to the mouth, i.e., the discharge opening or aperture of the nozzle, the size or area of the disk relative to the size or area of the nozzle opening, the shape or flatness of the disk, etc.

Thus, there are two separate and distinct ways to influence the direction of the path of a fluid jet, one of which includes an obstruction such as a disk, and the other a slot through which suction or pressure is applied to the fluid jet.

It has heretofore been difficult, if not impossible, to cause a jet of fluid emitted from a linear nozzle to assume a direction which is perpendicular to the axial path of the fluid emitted by the nozzle (except with the addition of a relatively large disk or deflector). According to this invention, the nozzle is arranged so that it is coordinated with an obstruction such as a disk and with a slot through which suction may be applied, and both the disk and the slot are combined to deflect a linear or axial jet of fluid through any desired angle. The combination can be caused to deflect the jet through a 90° angle (hereinafter called a "radial" angle or deflection) or even through a smaller or larger angle.

It is, therefore, one of the principal or general objects of this invention to devise a fluidic structure which can cause a moving jet of fluid to assume any desired direction, including a direction which is perpendicular to the axial or linear direction of the jet.

It is another object of this invention to provide a fluidic structure which employs both edge suction and a barrier in the path of emission of the fluid exiting from a nozzle, to cause the fluid to change direction by any desired amount, including a variation in its path to one which is perpendicular to the normal or axial direction through the nozzle.

In general, the fluidic structure of this invention may include a disk, or a control rod having a knob or disk or other obstruction, disposed in the main stream of a jet of fluid emitted from a nozzle, together with a slot in the fluidic structure immediately adjacent to the exiting opening of the nozzle and through which suction may be applied, to cause the jet of fluid to be deflected from its main path into another path or paths which may be different from, and may be perpendicular to, the main path. For example, the combination of edge suction together with a control rod will serve to transform an emitted cylindrical jet of fluid into a radial jet which is fanned out in directions substantially perpendicular to the path of the cylindrical jet. In accordance with this invention, the directional transformation may be achieved without substantial loss in the energy of the fluid transmitted through the fluidic structure. Such an arrangement can have and does have important commercial applications. It may be employed, for example, to cause a body or vehicle, propelled through space or over land, to be retarded or decelerated in its travel in a particular direction as may be desired. Such an arrangement may also be employed to effect any desired angular deflection of the fluid to actuate any of a plurality of devices or keys for controlling apparatus coupled to said devices or keys.

This invention will be better understood from the more detailed description hereinafter following when read in connection with the accompanying drawing, in which:

FIG. 5 is a variant of FIG. 4 in which the deflecting disk may be positioned upstream of the exit plane or mouth of the nozzle or pipe which transmits the jet of fluid;

FIG. 6 shows a streamline formation applicable to an arrangement similar to that of FIG. 5 except that the deflecting disk is positioned further upstream within the fluid transmitting nozzle or pipe;

FIG. 8 illustrates a further embodiment of a barrier employed in this invention; and FIGS. 9a and 9b illustrate two other embodiments of this invention.

Throughout the drawing like parts will be designated by like reference characters to simplify the description and facilitate its understanding.

Figure 1:
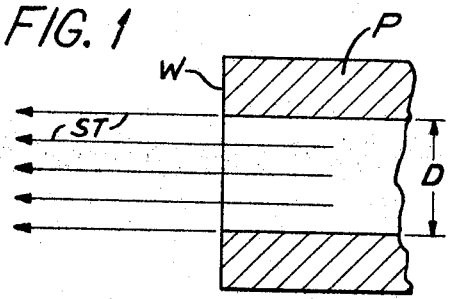
FIG. 1 shows, as prior art, a pipe emitting a jet of fluid.

FIG. 1 shows a cross-sectional view of a pipe or conduit P, which may be cylindrical and of a diameter D (or of any other cross-sectional shape) and having a front concentric wall W at the mouth or opening of pipe P, emitting a jet of fluid. If the exiting velocity is sufficiently high, the path of the fluid may be represented by the streamlines ST which may be substantially parallel to each other and parallel also to the center line of pipe P.

Figure 2:
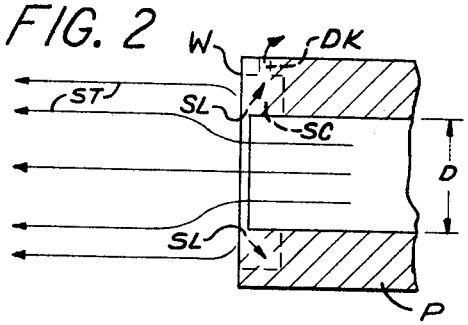
FIG. 2 shows, as additional prior art, a slot and a suction chamber for providing suction to an annular gap to cause an emitted jet to be deflected.

FIG. 2 illustrates a similar pipe P bearing a similar jet of fluid but, in this illustration, the pipe P embodies an annular slot SL concentric with pipe P, and the slot SL is in communication with a suction chamber SC which is connected via a duct DK to a source of suction. Suction applied to the annular suction gap or slot SL which rims the edge of the pipe P will displace the streamlines ST of the fluid from the centerline of the pipe, as shown. Thus, when no suction is applied, the streamlines SL will have the parallelism shown in FIG. 1, but when suction is present, the streamlines SL will have the shape shown in FIG. 2. That is, the flow is expanded in the cross section due to the applied suction. The amount of displacement from the normal or centerline will depend upon the amount of suction (among other factors which will be explained and described in connection with the present invention).

Figure 2A:
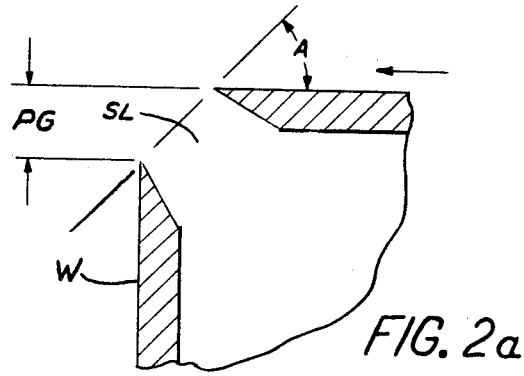
FIG. 2a shows a geometrical configuration suitable for a suction slot, such as that shown in FIG. 2, for effecting jet deflection.

FIG. 2a shows a cross-sectional view of a segment of the annular suction gap or slot SL of the arrangement of FIG. 2. The geometry of the suction slot SL shows a projection PG which is perpendicular to the axis of the pipe P and an angle A of inclination representing the angle between the two jaws or edges of the suction slot SL at the wall W with respect to the centerline of the pipe P. The dimension PG and the angle A as well as the suction rate determine the amount of expansion occurring in the fluid emitted from the end of the pipe P, as shown by the streamlines ST of FIG. 2. When the ratio of the volumetric suction rate to the total volumetric flow rate in pipe P is greater than a critical predetermined amount (which depends upon the suction gap geometry PG/D and angle A), the jet flow will expand rapidly upon exit from the pipe P. Consequently any desired expansion, within limits, may be achieved by predetermining these constants.

Figure 3A:
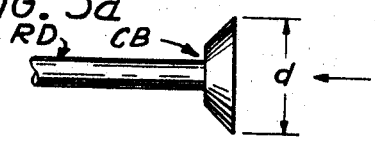
FIG. 3a shows one form of arrangement of a support rod along with a disk-shaped deflecting body attached to the support rod.
Figure 3:
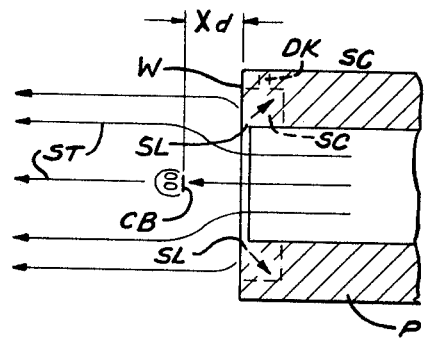
FIG. 3 shows the combination of a suction slot and a suction chamber together with a coacting control body for effecting deflection of the axial jet.

In wide contrast to the arrangement of FIG. 2, FIG. 3 illustrates a modification which includes, in addition to the annular slot SL through which suction is applied as in FIG. 2, a control body CB which is inserted directly into the path of the stream at a point some predetermined distance downstream from the exit of the pipe p preferably along the centerline of the flow path. The control body CB may be any substantially axisymmetric body with a bluff face against which the linear flow is directed. For example, the control body CB may embody a round disk of diameter $d$. The disk-shaped control body CB is shown in FIG. 3a. As shown in FIG. 3a, the control body CB may be supported by a rod RD which may, for example, extend downstream to some convenient mount or support (not shown). The relative position and dimensions of the support rod RD need not be significant; the position of the face of the disk in the direct path of the fluid is significant.

When the disk-shaped control body CB is positioned so that the disk is at a greater distance than approximately $X_d$ = one-third D downstream from the exit wall W, the gross or total flow of fluid from the pipe P beyond the disk will not be substantially different from that of the FIG. 2 arrangement which employed no control body such as CB. In other words, the flow effects of the control body CB at large distances from the exit wall W of the pipe P were minimal. They were minimal even though a separation bubble or eddies formed at the rear of the disk of the control body CB somewhat as shown in FIG. 3.

Figure 4:
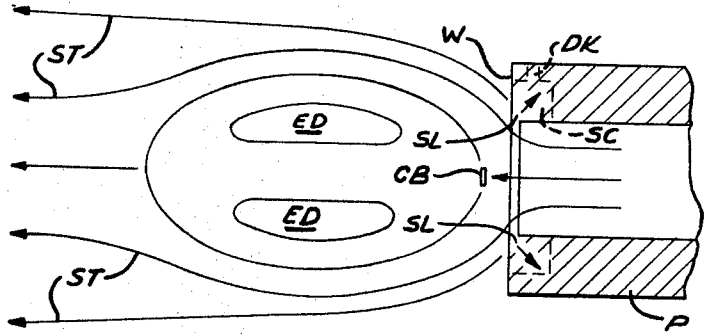
FIG. 4 shows the streamline formation of the fluid traversing a fluidic arrangement employing both suction and a deflecting disk.

As the face of the disk-shaped control body CB is moved closer than approximately one-third D to the exit wall W of the pipe P, the separation bubble or eddies immediately behind (i.e., downstream) of the disk will begin to grow. At some predetermined spacing more closely adjacent to the exit wall W of the pipe P than $X_d$ = one-third D, the streamline formation will be somewhat as shown in FIG. 4. The eddies ED downstream of the disk, while large and growing as the spacing toward the exit wall decreases, are of the general shape shown in FIG. 4. As the control body CB is moved still further upstream and the separation bubble further increases in size, a region is reached, quite suddenly, when the separation bubble completely ventilates, as is shown in FIG. 5. It will be observed from FIG. 5 that the streamlines ST are no longer parallel to the centerline or axis of the pipe P, but are instead perpendicular or radial to the centerline direction.

As the disk-shaped control body CB is moved further upstream beyond a predetermined range, the flow path of the fluid will revert to the axial direction. Hence, only within a certain predetermined range or ranges of linear movement of the disk along the centerline of the pipe P can one observe the transformation from axial flow to radial flow, or vice versa, which is clearly contrasted, for example, by FIGS. 3 and 5. When the disk-shaped control body CB is moved upstream within the pipe P for a distance equal to or greater than about the internal diameter D of the pipe P, the gross flow or total flow will remain about the same as, or only insignificantly different from, the gross flow or total flow occurring when the disk body CB is far downstream (such as shown on FIG. 3). This is more clearly shown in FIG. 6. In this disk position, the slight eddy formation adjacent to the downstream section of the control body CB will still be observable as indicated by this figure.

In order to produce radial flow of the type shown in FIG. 5, certain general requirements were followed. Without limiting the scope of this invention or the range of the disclosure, it may be generalized that the diameter of the circular disk of the control body CB should be approximately six percent or more of the internal diameter D of the pipe P, but the disk diameter need not exceed about 17 percent of the pipe diameter D. The smaller disk will suffice for a uniform flow toward the exit wall W of the pipe P. Such a flow may be generated by a short length of pipe between the fluid source and the exit wall W of the pipe P. The required disk size will increase toward the upper limit of about 17 percent per unit of the diameter D as the flow through the pipe P toward exit wall W builds up a thicker and thicker boundary layer, that is, becomes more and more nonuniform due to the increased total resistance arising from the increased length of the pipe P. Moreover, the projection PG should preferably be about 3.5 percent or more of the pipe diameter D, and the angle A should be greater than 30°. The required suction rate may be about five percent for a ratio of PG to D of about 0.035 and an angle A of about 60°. The location of the disk of the control body CB should preferably be slightly upstream of the pipe exit wall W, that is, within pipe P. A distance upstream somewhere between about 0.15 D and 0.20 D will always induce radial flow if the other requirements stated in the foregoing are satisfied. All of these constants assume substantially incompressible fluid flow and Reynolds numbers which do not differ substantially from $UD/v = 10^5$, where U is the average velocity within the pipe P and v is the kinematic viscosity.

Figure 7A:
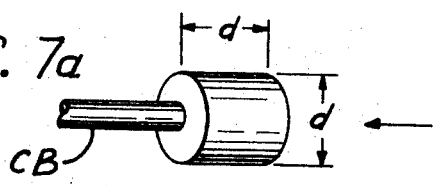
FIGS. 7a and 7b illustrate two other types of control bodies or barriers for use in the practice of this invention.
Figure 7B:
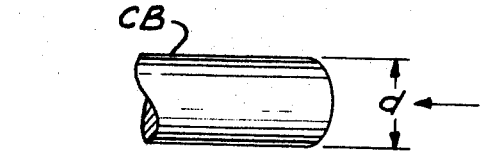

The disk-shaped control body CB referred to above generally conformed to the shape shown in FIG. 3a. The disk had a reentrant bevel toward the rear, making it equivalent to an infinitesimally thin disk for fluid flowing toward the disk. FIG. 7a shows a modified control body CB which is a circular cylindrical section having a length which is approximately equal to its diameter. Such a body will induce gross flows and deflections which are similar to those of the body shown in FIG. 3a. FIG. 7b shows a control body in the form of a solid flat-nosed rod which may be cylindrical and may have a diameter $d$ as shown. Such a rod will have the same effect as the disk of FIG. 3a or the device of FIG. 7a, insofar as radial diversion is concerned. Hence, certain details of the control body CB appear unimportant as long as the control body has a substantially flat nose with sharp edges. The applied suction as above described, when combined with any suitable control body, will convert the normal parallel streamline pattern into the radial streamline pattern.

FIG. 8 shows a modified arrangement which employs a circular cylindrical rod extending from a predetermined upstream point to a predetermined downstream point. The control body CB should be positioned so that its axis is substantially coincident with the centerline of pipe P. To produce the desired radial flow, the upstream end, or nose, of the control body CB should preferably be located a distance of the order of about one pipe D D upstream of the wall W, or further upstream, and the downstream end should preferably be located a distance of the order of one-third of a pipe diameter D downstream of the wall W or further downstream.

In the foregoing description, it will be noted that cylindrical flow, which is along the centerline of the pipe P, is readily convertible into a radial flow which fans out in all directions, along streamlines or planes which are substantially perpendicular to the centerline of pipe P. The convertibility is a reversible process. The reversibility is accomplished either by turning the suction flow on or off, or by changing the location of the control body CB along the centerline of pipe P.

It will be apparent that the pipe P and the disk-shaped control body CB, although described, respectively, as circularly cylindrical and circular, may have many other shapes. The pipe may have a square, rectangular, elliptical or other cross section and the control body CB may embody a disk of corresponding shape —square, rectangular, elliptical, etc.

The radial flow, when it is produced, may be caused to actuate a key or other responsive device to control other equipment (not shown). Such other equipment may be a recorder, for example. In practice, the control body may be moved, along the centerline of pipe P, from one predetermined position to another whenever desired to convert from the cylindrical flow to the radial flow to actuate the key or other responsive device above-noted, or vice versa. Alternatively the control body may be left in place at a predetermined position and suction switched on and off to effect the conversion.

FIGS. 9a and 9b illustrate two similar arrangements for converting a parallel beam flow along pipe P into a substantially conical flow (i.e., an umbrella-like flow). The flow adjacent the inner wall of pipe P, when made conically divergent as shown in FIGS. 9a and 9b, tends to remain affixed to the respective walls $W_1$ and $W_2$ of these FIGS. due to the Coanda effect. Furthermore, due to the suction applied through the annular slots SL and due also to the presence of the disk-shaped control bodies CB, the flow paths are rendered conical as shown in the respective FIGS. The path along wall $W_1$ will be caused to provide an apex angle of $B_1$; and the corresponding path along wall $W_2$ will determine an apex angle of $B_2$. Angle $B_1$ will be greater than 180°; angle $B_2$ will be less than 180°. However, any desired apex angle may be developed merely by controlling the angular positions of the end walls $W_1$ and $W_2$. Naturally, even a 360° apex angular sweep may likewise be developed if desired. If the suction at slot SL is removed or if the disk body CB is removed or oriented along the axis of pipe P beyond the limits generally outlined hereinabove, the original axial flow along the centerline of pipe P may be retained (or changed to the flow along to centerline from the conical flow).

According to one embodiment of this invention, dust-laden air or gas or other fluid may be passed along pipe P but, upon reaching the region of the control body CB and the adjacent wall W (such as, for example, in FIG. 5), the dust particles exceeding a predetermined size may be separated, that is, the air may be cleansed of such particles. The particles so affected will be moved in a direction substantially coinciding with the axis of pipe P, but the remainder of the fluid (and its smaller particles) will follow the conical path along or parallel to wall W.

Although the ratio of the diameter of the disk to the diameter of the conduit P has been discussed above, the ratio of the area of the disk to the area of the conduit may vary between 0.4 percent and three percent.

I claim:

1. Apparatus for deflecting the path of fluid traversing a conduit comprising a peripheral slot at the exit of the conduit through which suction is applied, and a disk positioned adjacent to the exit of the conduit against which fluid impinges, said disk having its center substantially coincident with the axis of the conduit.

2. Apparatus according to claim 1 in which the conduit is a circular cylinder and the disk is circular and of a diameter much smaller than that of the conduit.

3. Apparatus according to claim 2 in which the disk has a diameter between six percent and 17 percent of the diameter of the conduit.

4. Apparatus according to claim 3 in which the conduit has a wall adjacent its exit which is substantially perpendicular to the axis of the conduit and in which the slot is an annular opening throughout the intersection between the wall and the exit of said conduit.

5. Apparatus according to claim 4 in which the disk is movable between two predetermined positions along the axis of the conduit which are on opposite sides of the exit of the conduit.

6. Apparatus according to claim 5 in which a source of controllable suction is connected to the slot.

7. Apparatus according to claim 6 in which one of the two predetermined positions of the disk is outside the conduit but spaced from the conduit not more than one-third of the diameter of the conduit, and the other predetermined position is within the conduit but spaced within the exit a distance smaller than one diameter of the conduit.

8. Apparatus according to claim 7 in which the two jaws of the peripheral slot are spaced from each other by a predetermined distance when measured along the exit wall of the conduit and the angle between the jaws and the axis of the conduit is greater than 30°.

9. Apparatus for displacing the path of fluid traversing a linear conduit from its path along the axis of the conduit to a path substantially different from the axis of the conduit comprising a bluff axisymmetric device having its center substantially coinciding with a line drawn along the axis of the conduit and having a deflecting surface for deflecting fluid impinging upon said device, and an annular slot substantially coinciding with the periphery of the exit of the conduit through which suction is applied to assist in deflecting the fluid away from the axial path of the conduit.

10. Apparatus according to claim 9 including means for changing the position of the bluff device from a position on the upstream side of the exit of the conduit to a position on the other side of the exit of the conduit, both positions being substantially coincident with the axis of the conduit.

11. Apparatus according to claim 10 in which the conduit has an exiting wall which substantially coincides with the path to which the fluid is displaced.

12. Fluid deflecting mechanism for a nozzle comprising a bluff-faced body having a deflecting surface positioned so that its axis is substantially coincident with the axis of the nozzle and positioned also adjacent to the exit of the nozzle, and an annular slot in said nozzle positioned peripherally at the exit of the nozzle and extending throughout the periphery of the exit of the nozzle, suction applying means coupled to said slot and effective to change the direction of the exiting fluid into a path which is substantially different from the axis of the nozzle.

13. Fluid deflecting mechanism for a nozzle according to claim 12 in which the direction of the exiting fluid is substantially opposite to the diredtion of the fluid traversing the nozzle.

14. Fluid deflecting mechanism for a nozzle according to claim 12 in which the ratio of the area of the bluff-faced body to that of the nozzle varies between 0.4 and three percent.

15. Fluid deflecting mechanism for a nozzle according to claim 12, in which the bluff-faced body is adjustable within predetermined limits along a line coincident with the axis of the nozzle, the mechanism also including means for supplying adjustable suction to said annular slot.

16. Fluid deflecting mechanism for a nozzle according to claim 15 in which the direction of the exiting fluid is substantially perpendicular to the axis of the nozzle and travels in directions substantially perpendicular to the axis of the nozzle.

17. Fluid deflecting mechanism for a nozzle according to claim 16 in which the area of the face of the bluff-faced body upon which the fluid impinges is in the range of 0.4 to three percent of the area of the nozzle through which the fluid flows.

18. Fluid deflecting mechanism for a nozzle according to claim 17 including means for moving the bluff-faced body along a line substantially coincident with the axis of the nozzle to deflect fluid flow from one of the paths thereof to its other path.

19. Fluid deflecting mechanism for a nozzle according to claim 18 including mechanism responsive to the deflected fluid.